United States Patent
Kroner et al.

[15] 3,643,158
[45] Feb. 15, 1972

[54] TIMING DEVICE

[72] Inventors: James W. Kroner, Spanish Lake; Joseph J. Anthony, II, St. Louis, both of Mo.

[73] Assignee: William Kroner, Jr., St. Louis, Mo. a part interest

[22] Filed: May 18, 1970

[21] Appl. No.: 37,963

[52] U.S. Cl. ............................. 324/162, 73/517, 58/152 E
[51] Int. Cl. .................................................. G01p 15/00
[58] Field of Search .................... 324/162, 186, 178–180, 324/161, 158 MG; 235/92 A, 92 T, 104; 340/262; 58/39.5, 152 E, 145; 73/517, 518, 519, 514

[56] References Cited

UNITED STATES PATENTS 3,331,200  7/1967  Byron ............................. 324/162 UX

*Primary Examiner*—Michael J. Lynch
*Attorney*—Ralph W. Kalish

[57] ABSTRACT

A device for measuring the time elapsed between zero velocity and a predetermined velocity of a vehicle incorporating: an electrical timer connected in circuit with the vehicle battery and energized and deenergized by the operation of a timer switch; a speedometer having a velocity scale and an electrically conductive velocity indicating needle in circuit with said battery; a switch control apparatus having a switch closing contact mounted adjacent "zero" on the velocity scale in the path of needle movement and a switch-opening contact slidably mounted for presentation adjacent with the predetermined "velocity" and within the path of needle movement; so that upon commencement of acceleration said needle engages said switch-closing contact for closing a circuit to close said timer switch and energize said timer; and upon attainment of said predetermined velocity, said needle engages said switch-opening contact for closing a circuit to open said timer switch and deenergize said timer, thereby determining the elapsed time between the velocity differential.

8 Claims, 3 Drawing Figures

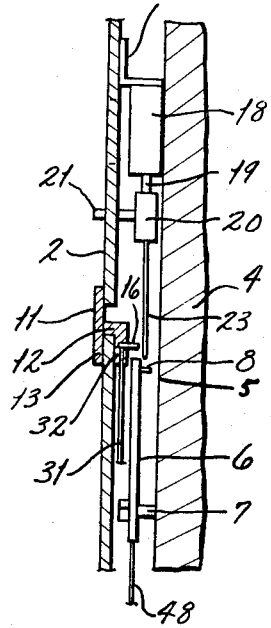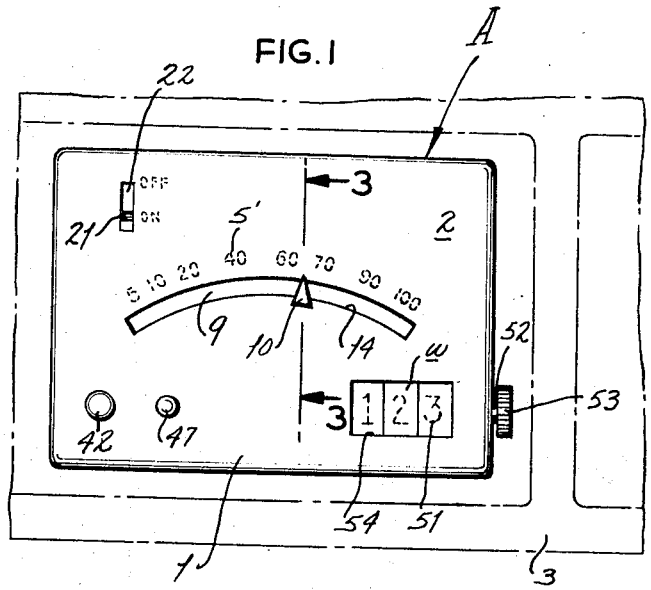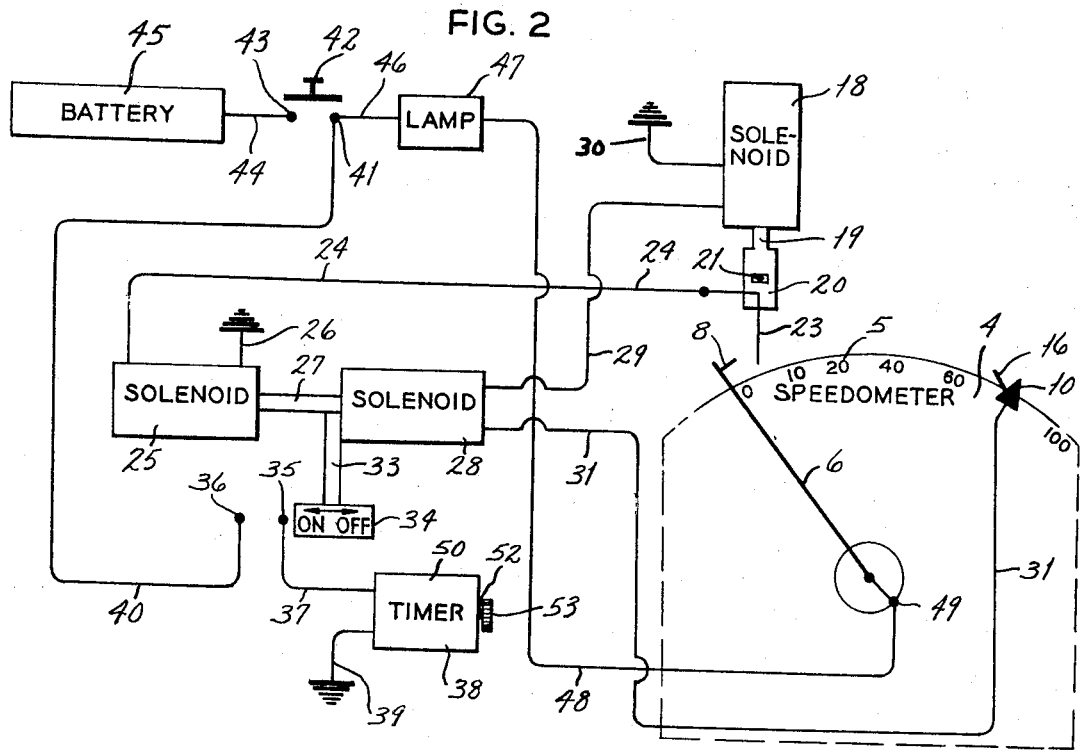

3,643,158

TIMING DEVICE

BACKGROUND AND SUMMARY OF THE INVENTION

The present invention relates in general to electrical measuring devices, and more particularly, to a device for measuring time elapsed between a predetermined velocity differential.

An object of the present invention is to provide a timing device for measuring elapsed time between zero velocity and a predetermined velocity which device may be readily installed on all types of vehicles without costly modification thereof.

Another object of the present invention is to provide a timing device of the type described which readily, efficiently and accurately determines the elapsed time between zero velocity and the attainment of a predetermined velocity.

A further object of the present invention is to provide a device of the type described which provides time readings automatically once the acceleration of the vehicle has commenced, thus enabling the driver to concentrate his full attention on the vehicle operation thereby being completely safe in operation.

Another object of the present invention is to provide a device of the type described whereby the performance of said vehicle may be accurately determined without the aid of an assistant by eliminating the heretofore necessary human agency to clock a vehicle with a stop watch.

A further object of the present invention is to provide a device of the type described which may be utilized for determining the condition of a track or road surface by comparing readings with previously obtained data.

Another object of the present invention is to provide a device of the type described which is inexpensive in manufacture; reliable and durable in usage; constructed of a minimum of parts; and comprised of minimum controls for operation by relatively unskilled personnel.

BRIEF DESCRIPTION OF THE DRAWINGS

FIG. 1 is a front elevational view of a timing device constructed in accordance with and embodying the present invention as shown installed within the dash of an automobile.

FIG. 2 is a block diagram illustrating the circuitry of the present invention.

FIG. 3 is a fragmentary vertical section taken on the line 3—3 of FIG. 1.

DESCRIPTION OF THE PREFERRED EMBODIMENT

Referring now by reference characters to the drawings which illustrate the preferred embodiment of the present invention, A generally designates a timing device comprising a housing 1 having a front wall 2 and rearwardly projecting top, bottom and sidewalls (not shown), which housing 1 is adapted for facile installation on all types of vehicles, including but not limited to automobiles, trucks, motorcycles and the like. For purposes of illustration, housing 1 is shown mounted within the dash 3 of an automobile.

Provided within housing 1 adjacent the inner face of front wall 2 is a speedometer 4 of the conventional type comprising a velocity-indicating scale 5 and a velocity-indicating, electrically conductive needle 6. One end portion of needle 6 is keyed or otherwise secured to a shaft 7 which is connected in the usual manner by a cable (not shown) to the vehicle transmission (not shown) so that upon acceleration of the vehicle, needle 6 will turn with shaft 7 to register the velocity of the moving vehicle on scale 5. At this juncture it will be noted that speedometer 4 is separate from the vehicle speedometer (not shown), although it is recognized that the device A of the present invention may be modified for usage with the regular vehicle speedometer. The cables of the respective vehicle speedometer (not shown) and speedometer 4 are connected to the transmission by an adapter so that same operate simultaneously.

The free end portion of needle 6 is provided with a striker arm 8 fixed in normal relationship thereto and directed inwardly toward scale 5. Needle 6 is observed through an arcuate slot 9 provided within housing front wall 2, said slot 9 being formed on the same arc as scale 5. Provided spacedly upwardly of slot 9 on the outer face of front wall 2 is a scale 5' which corresponds in all respects to scale 5 of speedometer 4.

Mounted within slot 9 is slide marker 10 fabricated of nonconductive material and embodying a generally triangular front face 11 presented outwardly of front wall 2 having a vertical dimension greater than that of slot 9. Projecting inwardly of front face 11 is a mounting leg 12 which cooperates with the lower end portion of front face 11 to develop a guideway 13 within which is received the lower marginal edge 14 of slot 9 (FIG. 3). Slide marker 10 is adapted for movement along margin 14 for selective positionment of its apex 15 at any one of the various indicated velocities on scale 5'. Fixed to the rearward face of leg 12 is an inwardly projecting finger 16 constructed of conductive material, which finger is disposed in axially parallel relationship with shaft 7 of needle 6 and within the path of needle movement. Accordingly, the arcuate movement of needle 6 will be terminated upon the latter engaging finger 16 during the acceleration of the vehicle, for purposes to be further described hereinbelow. Speedometer 4 is equipped with the conventional clutch (not shown) for preventing damage to speedometer 4 when needle 6 engages finger 16 and the vehicle continues to accelerate.

Mounted on the inner face of front wall 2 by bracket 17 is an electrical solenoid 18 located spacedly upwardly from the free end portion of needle 6 when the latter is positioned adjacent zero velocity on scale 5. Said solenoid 18 incorporates an armature 19 depending therefrom, the opposite end of which is fixed to a comparatively enlarged insulating block 20 fabricated of relatively light weight, insulating material, having formed on its front face a tab 21 which projects forwardly through a vertically disposed slot 22 provided within front wall 2. By grasping tab 21, insulating block 20 and armature 19 may be manually moved into an upward or downward position for purposes to be presently described. Provided within insulator block 20 is a conductive member 23 fabricated of a relatively thin diameter, highly flexible wire, one end portion extending downwardly for disposition between needle 6 and speedometer scale 5 when block 20 is down position (FIG. 3). The other end portion of conductive member 23 is connected by lead 24 to a solenoid 25 which is conveniently mounted within housing 1 and grounded thereto by lead 26. Disposed within solenoid 25 is one end portion of an armature 27, the other end portion of which is disposed within a solenoid 28; said solenoids 25 and 28 being axially aligned and laterally spaced apart for effecting a reciprocal movement of the common armature 27 therebetween. One side of solenoid 28 is connected in series by conductor 29 to solenoid 18 which is grounded to housing 1 by lead 30. The other side of solenoid 28 is connected by conductor 31 to finger 16 through a bore 32 drilled within mounting leg 12. As indicated hereinabove, slide marker 10 is fabricated of nonconductive material so that a user may move same along margin 14 without sustaining injury by electrical shock.

Engaged to said common armature 27 is an arm 33 of a slide switch 34 which latter is moved laterally responsive to the alternative energization of said solenoids 25 and 28. When armature 27 is attracted to solenoid 28, slide switch 34 is in an "off" position (FIG. 2) and when armature 27 is attracted to solenoid 25, slide switch 34 is in an "on" position wherein switch 34 engages contacts 35 and 36 for closing a circuit therebetween. Contact 35 is connected by lead 37 to a timer 38 which is grounded by a lead 39. Contact 36 is in circuit by conductor 40 with contact 41 of master pushbutton switch 42; said latter being in a normally open position projecting through an opening in front wall 2 for convenience of operation. Pushbutton 42 is adapted to engage contacts 41 and 43 which latter are in circuit by lead 44 with the battery 45 of the vehicle electrical system. Contact 41 is additionally in circuit by branch lead 46 to one side of a lamp 47 which projects outwardly through an opening in front wall 2 spacedly adjacent pushbutton 42 (FIG. 1). The other side of lamp 47 is connected by conductor 48 to a junction 49 which in turn is in circuit with the speedometer needle 6.

Timer 38 is of a conventional type comprising a casing 50 housing preferably three wheels w having numerical indicia 51 thereon, which wheels w are independently mounted on a shaft 52 for serial rotation through gearing (not shown) responsive to the energization of a small motor (not shown) provided therein. Said wheels w register elapsed time in seconds and tenths of seconds, as is well known in the art. Shaft 52 projects outwardly of casing 50 through an opening in housing 1 where its outer projecting end is provided with a knurled knob 53 for effecting return of the numerical indicia 51 on wheels w to zero setting after usage. Timer 38 is mounted within housing 1 adjacent a window 54 provided in front wall 2 so that the numerical indicia 51 on wheels w may be conveniently viewed therethrough. It will be understood that more or less than three wheels w may be utilized in timer 38 without departing from the essence of the present invention.

In operation, the driver of a vehicle will press pushbutton 42 inwardly for closing the circuit between contacts 41 and 43 thereby directing current from battery 45 through leads 44, 46 to illuminate lamp 47 and through conductor 48 through the needle 6 and striker arm 8 for placing the latter in a "hot" condition. Button 42 is adapted to remain in engagement with contacts 41 and 43 until pulled outwardly by the vehicle operator. The illumination of lamp 47 indicates to the operator that device A is ready for usage. The operator then grasps slide marker 10 and moves same along the lower margin 14 of slot 9 to the numeral indicating the desired velocity. For example, if the vehicle operator wishes to know the elapsed time for acceleration of the vehicle between 0 and 60 m.p.h. he positions the apex 15 of slide marker 10 at "60" on the velocity scale 5'. This action thus positions finger 16 within the path of needle 6 movement for engagement therewith upon the vehicle attaining the desired velocity. The driver then grasps tab 21 and urges same downwardly for positioning conductor 23 between needle 6 and speedometer scale 5 within the path of movement of the striker arm 8. Additionally, the vehicle operator will turn knob 53 so that the indicia 51 on timer wheels w will indicate "0". With the foregoing being completed, device A is conditioned to measure the time elapsed between zero velocity and the velocity at which apex 15 is positioned, such as the 60 m.p.h. indicated above.

Upon initiating acceleration of the vehicle, the transmission (not shown) through the speedometer cable (not shown) will effect the turning of shaft 7 for moving the needle arm 6 in its customary arcuate path. The "hot" striker arm, 8 simultaneously with the commencement of vehicle acceleration, will engage conductor 23 for closing the circuit through lead 24 to energize solenoid 25. Armature 27 will be moved toward solenoid 25 along with arm 33 and switch 34 for effecting engagement of the latter with contacts 35 and 36, thus completing the circuit to timer 38 through lead 37, conductor 40 and lead 44 to battery 45. Upon energization of timer 38, wheels w will turn for recording the time in seconds and tenths of seconds. Timer 38 will remain energized until switch 34 is opened. This is accomplished when needle 6 engages finger 16 to close the circuit through conductor 31 for energizing solenoid 28. Armature 27 is attracted laterally toward solenoid 28 for moving arm 33 and switch 34 laterally thereby opening switch 34 for deenergizing timer 38. Substantially simultaneously with the energization of solenoid 28, the said solenoid 18 through lead 29 is energized for elevating armature 19, and thence conductive member 23, so that the latter is removed from the path of needle movement. Therefore, upon deceleration of said vehicle, striker arm 8 will bypass conductive member 23 so that solenoid 25 will remain deenergized. The vehicle operator may then readily observe the time elapsed by viewing the indicia 51 through housing window 56. Thus, by the present invention the time elapsed between zero velocity and a predetermined velocity may be readily, accurately, and safely obtained.

Having thus described our invention, what we claim and desire to obtain by Letters Patent is:

1. For use with a vehicle having a source of electrical power and a transmission, a device for measuring the time elapsed between a zero velocity setting and a predetermined setting comprising: means defining a housing; electrical timing means mounted within said housing; first conductor means connecting said electrical timing means to said source of power; a normally opened time switch located within said first conductor means between said electrical timing means and said power source; velocity measuring means mounted within said housing; said velocity measuring means comprising a needle and a velocity scale; means operatively engaging said needle to said vehicle transmission for moving said needle along said velocity scale responsive to the vehicle velocity; said needle being constructed of conductive material; second conductor means connecting said needle to said source of power; a first contact being positioned adjacent said zero velocity setting of said scale within the path of needle movement, a second contact positioned adjacent said predetermined velocity setting within the path of needle movement, first switch control means in circuit with said power source and said first contact for closing said switch and energizing said timing means upon commencement of vehicle acceleration; second switch control means in circuit with said power source and said second contact for opening said timer switch and deenergizing said timing means upon attainment of said predetermined velocity.

2. The invention as defined in claim 1 and further characterized by said first switch control means comprising a first solenoid; said second switch control means comprising a second solenoid; said first and second solenoids being disposed in axially aligned, spaced apart relationship; an armature having opposite end portions received within said first and second solenoids for axial movement with respect to said first and second solenoids responsive to the energization of the same; means operatively engaging said switch to said armature whereby when said first solenoid is energized said switch will be closed and when said second solenoid is energized said switch will be opened.

3. The invention as defined in claim 1 and further characterized by said first contact comprising a relatively thin diameter, highly flexible wire, means mounting said first contact for presentation immediately adjacent said zero velocity setting.

4. The invention as defined in claim 3 and further characterized by a striker arm mounted on the free end portion of said needle in normal relationship therewith; said flexible wire positioned in parallel relationship with said needle; said striker arm having a length for conductively engaging said wire substantially instantaneously upon commencement of vehicle acceleration.

5. The invention as defined in claim 1 and further characterized by there being an arcuate slot provided within said housing in registration with said velocity scale; a velocity marker slideably mounted within said slot for selective movement to a predetermined velocity setting; a finger fixed to said velocity marker and presented within the path of needle movement; said finger constituting said second contact.

6. For use with a vehicle having a source of electrical power and a transmission, a device for measuring the time elapsed between a zero velocity setting and a predetermined setting comprising: means defining a housing; electrical timing means mounted within said housing; first conductor connecting said timing means to said source of power; a normally opened switch located within said first conductor means between said timing means and said power source; velocity measuring means mounted within said housing; said velocity measuring means comprising a needle and a velocity scale, means operatively engaging said needle to said vehicle transmission for moving said needle along said scale responsive to the vehicle velocity; said needle being constructed of conductive material; second conductor means connecting said needle to said source of power; a first contact being positioned adjacent said zero velocity setting on said scale within the path of needle movement; a second contact positioned adjacent said predetermined velocity setting within the path of needle movement; a first switch control means including a first solenoid in circuit with said power source and said first contact for closing said switch and energizing said timing means upon commencement of vehicle acceleration; second switch control means including a second solenoid in circuit with said power source and said second contact for opening said switch and deenergizing said timing means upon attainment of said predetermined velocity; said first and second solenoids being disposed in axially aligned, spaced-apart relationship; an armature having opposite end portions received within said first and second solenoids; means operatively engaging said switch to said armature; a third solenoid mounted within said housing upwardly of said zero velocity setting; an armature within said third solenoid; said first contact being connected to said third solenoid armature; circuit means connecting said third solenoid in series with said second solenoid so that upon energization of said second solenoid, said third solenoid will be energized for elevating said first contact from the path of needle movement.

7. The invention as defined in claim 6 and further characterized by a master switch provided within said housing, a third contact in circuit with said source of power; a fourth contact connected to said first and second conductor means so that upon closing of said master switch current will be directed from said power source through said first and second conductor means.

8. For use with a vehicle having a source of electrical power and a transmission, a device for measuring the time elapsed between a zero velocity setting and a predetermined setting comprising means defining a housing; an electrical timer mounted within said housing; conductor means connecting said timer to said source of power; a normally opened timer switch having a switch arm and being located within said conductor means between said timer and said power source; a first and second solenoid switch control in circuit with said power source and being disposed in axial alignment, a common armature for said first and second solenoids for alternate movement between same responsive to the energization of said first and second solenoids, means connecting said armature to said switch arm whereby upon energization of said first solenoid said switch will be closed for energizing said timer and upon energization of said second solenoid said armature will be moved for opening said timer switch, and means responsive to vehicle movement sequentially energizing said first and second solenoids whereby the time elapsed may be determined by said timer.

* * * * *